(12) United States Patent
Moriyama et al.

(10) Patent No.: US 8,396,264 B2
(45) Date of Patent: Mar. 12, 2013

(54) FACE MATCHING DEVICE, ELECTRONIC DEVICE, FACE MATCHING DEVICE CONTROL METHOD, AND FACE MATCHING DEVICE CONTROL PROGRAM

(75) Inventors: Kozo Moriyama, Kyoto (JP); Takashi Kakiuchi, Kyoto (JP)

(73) Assignee: OMRON Corporation, Kyoto (JP)

( * ) Notice: Subject to any disclaimer, the term of this patent is extended or adjusted under 35 U.S.C. 154(b) by 247 days.

(21) Appl. No.: 13/059,381

(22) PCT Filed: Feb. 22, 2010

(86) PCT No.: PCT/JP2010/001133
§ 371 (c)(1),
(2), (4) Date: Feb. 16, 2011

(87) PCT Pub. No.: WO2010/103735
PCT Pub. Date: Sep. 16, 2010

(65) Prior Publication Data
US 2011/0150302 A1 Jun. 23, 2011

(30) Foreign Application Priority Data
Mar. 13, 2009 (JP) ................................. 2009-062039

(51) Int. Cl.
*G06K 9/00* (2006.01)
(52) U.S. Cl. ....................................... 382/118; 382/224
(58) Field of Classification Search .................. 382/118, 382/224
See application file for complete search history.

(56) References Cited

U.S. PATENT DOCUMENTS

| 6,608,914 B1 | 8/2003 | Yamaguchi et al. | |
|---|---|---|---|
| 2003/0194113 A1 | 10/2003 | Yamaguchi et al. | |
| 2008/0123907 A1 | 5/2008 | Eura et al. | |
| 2010/0073497 A1* | 3/2010 | Katsumata et al. | 348/211.99 |
| 2010/0123816 A1* | 5/2010 | Koh et al. | 348/333.05 |

FOREIGN PATENT DOCUMENTS

| JP | 11-175718 A | 7/1999 |
|---|---|---|
| JP | 2003-44858 A | 2/2003 |
| JP | 2004-54888 A | 2/2004 |
| JP | 2006-59200 A | 3/2006 |
| JP | 2006-92491 A | 4/2006 |
| JP | 2007-102517 A | 4/2007 |
| JP | 2008-129830 A | 6/2008 |
| JP | 2008-165314 A | 7/2008 |

OTHER PUBLICATIONS

International Search Report w/translation from PCT/JP2010/001133 dated Mar. 23, 2010 (2 pages)
Written Opinion from PCT/JP2010/001133 dated Mar. 23, 2010 (5 pages).

* cited by examiner

*Primary Examiner* — Brian Q Le
*Assistant Examiner* — Michael Vanchy, Jr.
(74) *Attorney, Agent, or Firm* — Osha Liang LLP

(57) ABSTRACT

A face matching device (1) of the present invention includes: a target image obtaining section (101) for obtaining a target face image capturing time, that is, the time of capturing a target face image; and a matching use image selecting section (104) for selecting, on the basis of (i) the target face image capturing time obtained by the target image obtaining section (101) and (ii) a reference face image capturing time stored in a reference image database (121), a reference face image for use in matching. With the arrangement, it is possible to carry out accurate matching with respect to a desired face image among a plurality of images including face images which show respective persons of various ages.

10 Claims, 6 Drawing Sheets

REFERENCE IMAGE DATABASE

- ID
- DATE AND TIME OF CAPTURING IMAGE
- AGE
- DATE OF BIRTH
- FEATURES DATA

| REFERENCE FACE IMAGE | SIMILARITY | APPLICABILITY | MATCHING RELIABILITY |
|---|---|---|---|
| A1 | 0.8 | 0.8 | 0.76 |
| A2 | 0.6 | 0.7 | |
| A3 | 0.9 | 0.5 | |
| B1 | 0.6 | 0.6 | 0.32 |
| B2 | 0.2 | 0.5 | |
| B3 | 0.1 | 0.5 | |

FACE MATCHING DEVICE, ELECTRONIC DEVICE, FACE MATCHING DEVICE CONTROL METHOD, AND FACE MATCHING DEVICE CONTROL PROGRAM

TECHNICAL FIELD

The present invention relates to (i) a face matching device for matching a target face image with a face image of a registered person, (ii) an electronic device, (iii) a face matching device control method, and (iv) a face matching device control program.

BACKGROUND ART

As digital still cameras and digital video cameras (hereinafter collectively referred to as "digital cameras") have become in widespread use in recent years, a storage medium such as a memory and a hard disk stores a large volume of digital data (images), such as still images and moving images, captured with the digital cameras. Since a storage medium thus stores a large number of images, it is becoming increasingly difficult to, for example, (i) retrieve, from the images stored, an image of a desired person or (ii) classify the images by a person in each image.

To retrieve a desired image from numerous images or classify such numerous images, so-called facial recognition can be carried out, in which a registered face image is matched with a captured face image (biological information) so as to determine whether a person in the registered face image is identical to a person in the captured face image.

Facial recognition, however, has a problem that matching accuracy decreases over time because the face of a person changes over time in actuality due to aging although a registered image of the face does not change.

To solve this problem, Patent Literature 1 discloses a technique of reducing an influence of such a change due to aging by (i) generating, from an image inputted in matching and an image stored, an image to be newly registered, and (ii) automatically updating the stored image to the newly generated image.

Patent Literature 2 discloses a technique of increasing recognition accuracy by using a plurality of biological information items in recognition.

Patent Literature 3 discloses a technique of deleting, from a storage medium, an image of low importance which image has been stored in the storage medium for an extended period of time since the image was registered or last used in matching.

Patent Literature 4 discloses a technique of increasing recognition accuracy by determining features for use in facial recognition which features correspond to a period between a time at which a face image was registered and a time at which an image of the face was captured.

Patent Literature 5 discloses a technique of carrying out recognition in accordance with actuality by using, in recognition, biological recognition data (image data) captured at a plurality of past times.

Patent Literature 6 discloses a technique of carrying out delta compression of a captured face image for storage on the basis of a difference between (i) the captured face image and (ii) a similar face image exhibiting a similarity which is not below a predetermined reference value.

CITATION LIST

Patent Literature 1

Japanese Patent Application Publication, Tokukaihei, No. 11-175718 A (Publication Date: Jul. 2, 1999)

Patent Literature 2

Japanese Patent Application Publication, Tokukai, No. 2003-44858 A (Publication Date: Feb. 14, 2003)

Patent Literature 3

Japanese Patent Application Publication, Tokukai, No. 2004-54888 A (Publication Date: Feb. 19, 2004)

Patent Literature 4

Japanese Patent Application Publication, Tokukai, No. 2007-102517 A (Publication Date: Apr. 19, 2007)

Patent Literature 5

Japanese Patent Application Publication, Tokukai, No. 2006-92491 A (Publication Date: Apr. 6, 2006)

Patent Literature 6

Japanese Patent Application Publication, Tokukai, No. 2006-59200 A (Publication Date: Mar. 2, 2006)

SUMMARY OF INVENTION

Technical Problem

The respective techniques for facial recognition and the like disclosed in Patent Literatures 1 through 6 may be used to retrieve a desired image from digital data (images) stored in a storage medium or classify the images as described above. However, in a case where the techniques disclosed in Patent Literatures 1 through 6 are used for retrieval and classification of digital data without modifications, the following problem occurs: Although a storage medium stores images of an identical person, such images are for different ages. Even if the recognition technique disclosed in Patent Literature 1 is used to retrieve a target image from the images stored in a storage medium or to classify the images, the recognition technique cannot deal with images of an identical person at different ages. This is because the technique disclosed in Patent Literature 1 updates registered data to deal with a most recent appearance of a person serving as a recognition target. The technique results in decreased recognition accuracy for an image of the person at an age with which the technique cannot deal, and thus does not necessarily make it possible to accurately carry out matching with respect to a target image for image retrieval or classification.

The technique disclosed in Patent Literature 2 is used to carry out recognition with use of a plurality of biological information items, and thus cannot deal with images of a person at different ages which images are stored in a storage medium.

The technique disclosed in Patent Literature 3 is used to delete an image of low importance from a storage medium, and thus cannot be used for accurate matching, retrieval, and classification of images.

The technique disclosed in Patent Literature 4 is used to determine features corresponding to a period between a time at which a face image was registered and a time at which an image of the face was captured. The features corresponding to such a period are, however, merely calculatory, and thus fail to represent the actual face. The technique thus does not necessarily enable accurate recognition. This indicates that the technique does not necessarily enable accurate matching, retrieval, and classification of images.

The technique disclosed in Patent Literature 5 is used to recognize a current face with use of biological recognition data captured at a plurality of past times. The technique thus does not enable accurate recognition of images of a person at different ages. This indicates that the technique does not necessarily enable accurate matching, retrieval, and classification of images.

The technique disclosed in Patent Literature 6 is used to carry out delta compression of a captured face image for storage. The technique thus does not enable accurate matching, retrieval, and classification of images.

The present invention has been accomplished in view of the above problem. It is an object of the present invention to provide, for example, a face matching device which can accurately select for matching a desired face image from a plurality of images including face images of a person at different ages.

Solution to Problem

In order to solve the above problem, a face matching device of the present invention is a face matching device for matching (i) a target face image, included in a captured image and serving as a matching target, with (ii) a reference face image, registered in a reference image database and serving as a face image for reference, the reference image database being capable of (i) storing a plurality of reference face images for each registered person and further (ii) storing, for each of the plurality of reference face images, a reference face image capturing time, which is a time of capturing said each of the plurality of reference face images, the face matching device including: obtaining means for obtaining a target face image capturing time, which is a time of capturing the target face image; and selecting means for selecting the reference face image for use in the matching on a basis of (i) the target face image capturing time obtained by the obtaining means and (ii) the reference face image capturing time stored in the reference image database.

A method of the present invention for controlling a face matching device is a method for controlling a face matching device for matching (i) a target face image, included in a captured image and serving as a matching target, with (ii) a reference face image, registered in a reference image database and serving as a face image for reference, the reference image database being capable of (i) storing a plurality of reference face images for each registered person and further (ii) storing, for each of the plurality of reference face images, a reference face image capturing time, which is a time of capturing said each of the plurality of reference face images, the method including the steps of: (a) obtaining a target face image capturing time, which is a time of capturing the target face image; and (b) selecting the reference face image for use in the matching on a basis of (i) the target face image capturing time obtained in the step (a) and (ii) the reference face image capturing time stored in the reference image database.

According to the arrangement and method above, the reference face image for use in the matching is selected on the basis of (i) the target face image capturing time, that is, the time of capturing the target face image obtained and (ii) the reference face image capturing time stored in the reference image database.

With the arrangement, it is possible to select the reference face image for use in the matching while taking into consideration the time of capturing the target face image and the time of capturing each of the reference face images. A reference face image captured at a time close to the time of capturing the target face image includes an image of a registered person whose age is close to an age of the registered person at the time of capturing the target face image. As such, it is possible to carry out more accurate matching by selecting a reference face image captured at a time close to the time of capturing the target face image.

Suppose, for example, that the reference image database stores, as reference face images, images of two persons, namely A (born in 1980) and B (born in 1970), and that the reference image database specifically stores (i) three face images of A, that is, one captured in 1985 (A1), one captured in 1990 (A2), and one captured in 1998 (A3), and (ii) three face images of B, that is, one captured in 1988 (B1), one captured in 1991 (B2), and one captured in 19998 (B3). Suppose further that a target image shows the person A and was captured in 1998 (when the person A was 18 years old). If the target image were matched with all reference face images, the target image might erroneously be matched with the face image B1, in which the person B at the age of 18 appears.

In contrast, in a case where reference face images whose respective capturing times are close to the time of capturing the target image are selected as reference face image for use in matching, the face matching device will select the face images A3 (the person A at the age of 18) and B3 (the person B at the age of 28) as reference face images. Thus, there is only a low possibility that the face matching device will determine that the person A at the age of 18 is identical to the person B at the age of 28. As a result, it is possible to carry out accurate matching.

Advantageous Effects of Invention

As described above, a face matching device of the present invention is arranged such that the reference image database is capable of (i) storing a plurality of reference face images for each registered person and further (ii) storing, for each of the plurality of reference face images, a reference face image capturing time, which is a time of capturing said each of the plurality of reference face images, and that the face matching device includes: obtaining means for obtaining a target face image capturing time, which is a time of capturing the target face image; and selecting means for selecting the reference face image for use in the matching on a basis of (i) the target face image capturing time obtained by the obtaining means and (ii) the reference face image capturing time stored in the reference image database.

A method of the present invention for controlling a face matching device is arranged such that the reference image database is capable of (i) storing a plurality of reference face images for each registered person and further (ii) storing, for each of the plurality of reference face images, a reference face image capturing time, which is a time of capturing said each of the plurality of reference face images, and that the method includes the steps of: (a) obtaining a target face image capturing time, which is a time of capturing the target face image; and (b) selecting the reference face image for use in the matching on a basis of (i) the target face image capturing time obtained in the step (a) and (ii) the reference face image capturing time stored in the reference image database.

With the arrangement, it is possible to select the reference face image for use in the matching while taking into consideration the time of capturing the target face image and the time of capturing each of the reference face images. A reference face image captured at a time close to the time of capturing the target face image includes an image of a registered person whose age is close to an age of the registered person at the time of capturing the target face image. As such, it is possible to carry out more accurate matching by selecting a reference face image captured at a time close to the time of capturing the target face image.

A face matching device of the present invention is arranged such that the reference image database is capable of (i) storing a plurality of reference face images for each registered person and further (ii) storing a time of birth of the registered person and a reference image age, which is an age of the registered person at a time of capturing each of the plurality of reference face images, and that the face matching device includes: obtaining means for obtaining a target face image capturing time, which is a time of capturing the target face image; and selecting means for selecting the reference face image for use in the matching on a basis of (i) the target face image capturing time obtained by the obtaining means and (ii) the time of birth and the reference image age both stored in the reference image database.

A method of the present invention for controlling a face matching device is arranged such that the reference image database is capable of (i) storing a plurality of reference face images for each registered person and further (ii) storing a time of birth of the registered person and a reference image age, which is an age of the registered person at a time of capturing each of the plurality of reference face images, and that the method includes the steps of: (a) obtaining a target face image capturing time, which is a time of capturing the target face image; and (b) selecting the reference face image for use in the matching on a basis of (i) the target face image capturing time obtained in the step (a) and (ii) the time of birth and the reference image age both stored in the reference image database.

With the arrangement, it is possible to select, while taking into consideration the age of the target person at the time of capturing the target face image, a reference face image whose reference image age is suitable for the age of the target person at the time of capturing the target face image. By selecting a reference face image whose reference image age is suitable for the age of the target person at the time of capturing the target face image, it is possible to carry out more accurate matching.

Additional objects, features, and strengths of the present invention will be made clear by the description below. Further, the advantages of the present invention will be evident from the following explanation in reference to the drawings.

DESCRIPTION OF EMBODIMENTS

Figure 1:
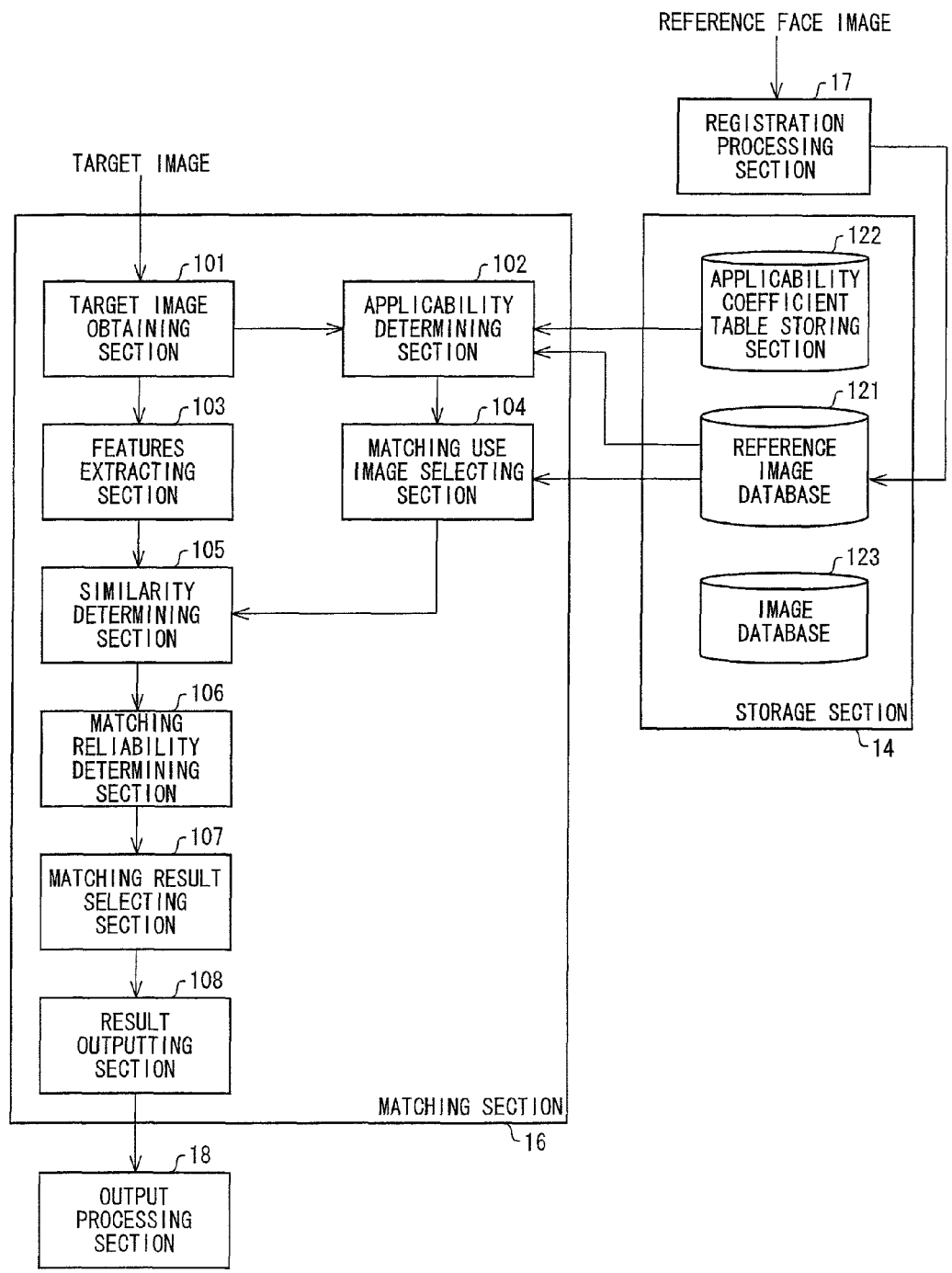
FIG. 1 is a block diagram illustrating main components of a matching section and a storage section in accordance with an embodiment of the present invention.

The following description deals in further detail with the present invention on the basis of examples and comparative examples. The present invention is, however, not limited to the examples in any manner.

An embodiment of the present invention is described below with reference to FIGS. 1 through 8. FIG. 2 is a block diagram of a face matching device 1 according to the present embodiment. As illustrated in FIG. 2, the face matching device (electronic device) 1 includes: a display section (informing means) 11; an external equipment connection section 12; an operation section 13; a storage section 14; and a control section 10. The description below assumes that the face matching device 1 is a personal computer. Note however that the face matching device 1 is not limited to this. The face matching device 1 can thus be any of various devices, such as a digital camera, having a function of matching images with each other.

The face matching device 1 determines which of respective images of faces of registered persons (reference face images; each serving as a reference for matching and stored in the storage section 14) is the most similar to the face (target face image) of a person appearing in an image (target image) serving as a matching target. The image serving as a matching target is, for example, an image stored in the storage section 14 or an image obtained from external equipment connected to the face matching device 1 via the external equipment connection section 12. The face matching device 1 thus displays a result of the determination.

The description below assumes that the face matching device 1 carries out a search as described above by matching reference face images with a captured image serving as a matching target. The face matching device 1 can, for example, carry out the search by matching stored features of each reference face image with features of a captured image.

The face matching device 1 can accurately determine which reference face image is similar to the face of a person appearing in an image serving as a matching target by appropriately selecting a reference face image, in which a face serving as a reference appears, on the basis of applicability (described later).

The face matching device 1 can not only display a matching result, but also classify an image in accordance with the matching result.

The following description deals with the constituent members of the face matching device 1.

The display section 11 displays, for example, (i) a result of matching carried out by the face matching device 1, (ii) an operation carried out by the face matching device 1, and (iii) a state of the face matching device 1. The display section 11 can be any device that can display information. The display section 11 is, for example, an LCD (liquid crystal display), an organic EL (electroluminescence) display, or a plasma display.

The external equipment connection section 12 is connected to external equipment, and thus transmits and receives data to and from the external equipment. The external equipment is, for example, a scanner or a hard disk.

The operation section 13 accepts an operation carried out by a user and directed to the face matching device 1.

The storage section 14 stores data such as (i) image data including reference face images each serving as a reference for matching and a captured image serving as a matching target, and (ii) data including programs for operating the face matching device 1. The storage section 14 is, for example, a flash memory. The storage section 14 will be described later in further detail.

The control section 10 carries out operations such as matching, a search, and registration of a reference face image, in the face matching device 1. The control section 10 will be described below in further detail.

The control section 10 will now be described. The control section 10 includes: a matching section 16; a registration processing section 17; and an output processing section 18.

Figure 2:
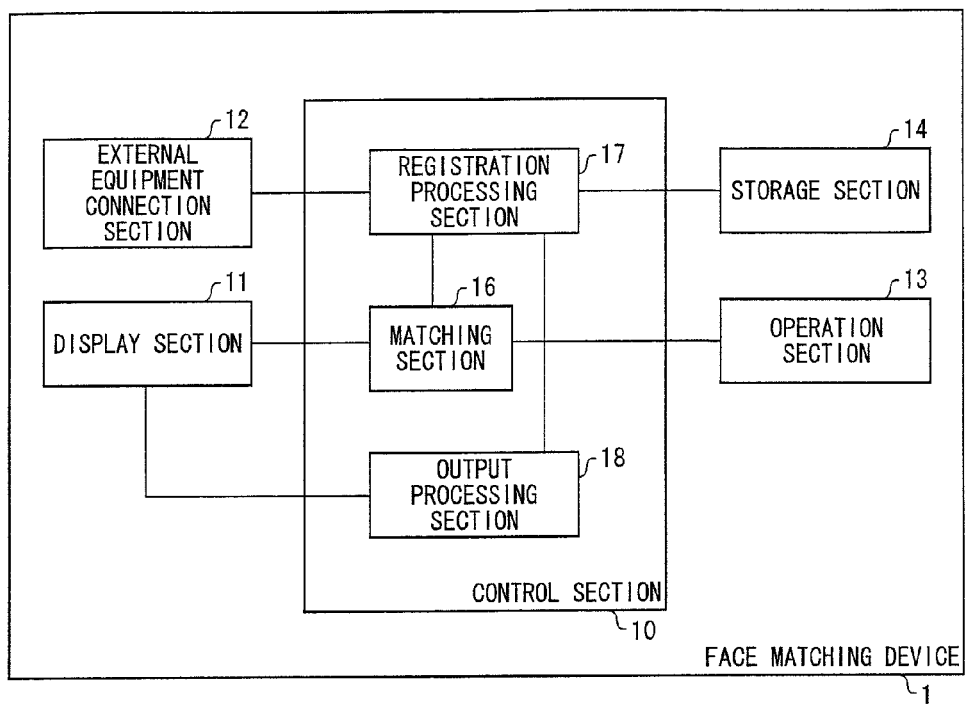
FIG. 2 is a block diagram illustrating main components of a face matching device in accordance with the embodiment.

As illustrated in FIG. 1, the matching section 16 includes: a target image obtaining section (obtaining means) 101; an applicability determining section (applicability determining means, target image age determining means) 102; a features extracting section 103; a matching use image selecting section (selecting means) 104; a similarity determining section 105; a matching reliability determining section (weighted matching result determining means) 106; a matching result selecting section 107; and a result outputting section (inquiring means) 108. FIG. 1 is a block diagram illustrating respective configurations of the matching section 16 and the storage section 14 according to the present embodiment.

As illustrated in FIG. 1, the storage section 14 includes: a reference image database 121; an applicability coefficient table storing section 122; and an image database 123.

Figure 3:
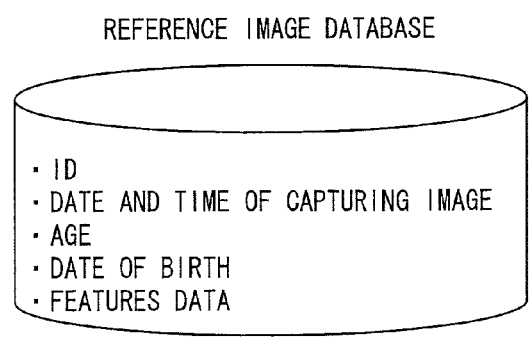
FIG. 3 is a diagram indicative of data stored in a reference image database in accordance with the embodiment.

The reference image database 121 stores data of reference face images each serving as a reference for matching. The reference image database 121 stores data illustrated in FIG. 3. As illustrated in FIG. 3, the reference image database 121 stores, other than reference face images themselves: (i) an ID (identification) corresponding to each reference face image; (ii) a date and time of capturing the reference face image (a year, month, and date of image capture, a time of image capture, and a reference image time); (iii) the age (reference image age) of a person in the reference face image at the time of capturing the reference face image and the date of birth (time of birth) of the person; and (iv) features data of the reference face image. The ID is, for example, the name of the person appearing in the reference face image. In the description below, information about a reference image age refers to either the reference image age itself or information with which the reference image age can be determined.

Figures 4, 5:
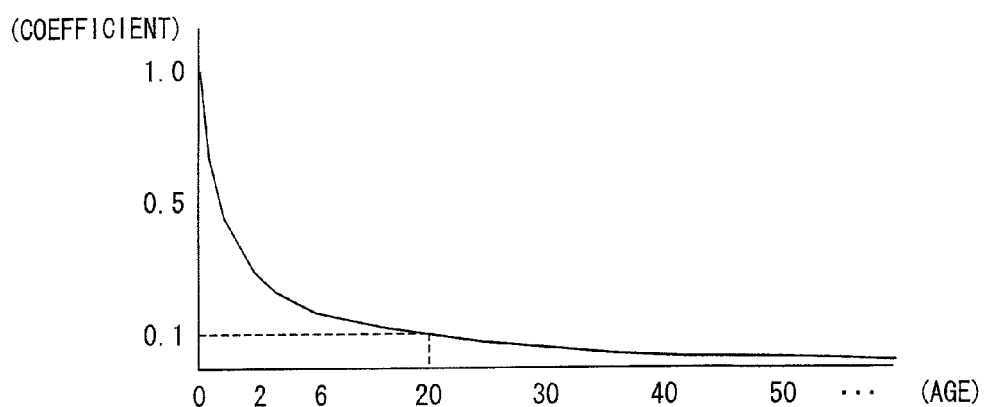
FIG. 4 is a graph indicative of an example relation between (i) a coefficient for determining an applicability and (ii) an age of a target person at a time of capturing a captured image in accordance with the embodiment.
FIG. 5 is an explanatory table indicative of (i) example similarities and applicabilities for each ID and (ii) matching reliabilities in accordance with the embodiment.

The applicability coefficient table storing section 122 stores an applicability coefficient table which indicates a correspondence between (i) the age (target image age) of a registered person, appearing in a reference face image, at the time (target image time) of capturing a captured image (target image) of the registered person and (ii) a coefficient. The applicability indicates how suitably a reference face image is applicable in matching with a captured image. In the present embodiment, the applicability is given by the following equation: applicability=1/(difference between (i) the date of capturing a captured image and (ii) the date of capturing a reference face image×coefficient). The coefficient serves to statistically determine the applicability for a captured image on the basis of the age of a target person at the time of capturing the captured image. The coefficient has an upper limit of "1" (indicative of no change), which corresponds to a difference of one (1) day for a newborn between the date of capturing a captured image and the date of capturing a reference face image. FIG. 4 is a graph illustrating an example of the correspondence between (i) the coefficient for determining an applicability and (ii) the age of a target person at the time of capturing a captured image.

FIG. 4 is an example graph corresponding to an applicability coefficient table indicative of the correspondence between (i) the coefficient for determining an applicability and (ii) the target image age, that is, the age of a registered person at the time of capturing a target image. As illustrated in FIG. 4, the coefficient is at its largest ("1") for the age of 0, and decreases as the age increases. The coefficient changes more rapidly at a younger age. Further, according to the example of FIG. 4, the coefficient is 0.1 for a registered person whose age is 20 at the date of capturing a captured image. As such, in a case where, for example, the target person is (i) at the age of 20 at the date of capturing a captured image and (ii) at the age of 18 (reference image age) at the date of capturing a reference face image, the applicability is determined as follows: applicability=1/(365×2×0.1)=0.014.

Note that the applicability is not necessarily determined as described above. The applicability can thus be determined by any method that makes it possible to indicate how suitably a reference face image is applicable in matching with a captured image. Note also that although the applicability is determined with the use of a coefficient in the above example, the applicability can instead be determined, without the use of a coefficient, on the basis of only a difference between the date of capturing a captured image and the date of capturing a reference face image.

The image database 123 stores images. The images stored in the image database 123 include (i) an image obtained from external equipment (for example, a scanner or a digital camera) connected to the face matching device 1 via the external equipment connection section 12, and (ii) an image obtained from the Internet in a case where the face matching device 1 can access the Internet. The image database 123 stores such images and a date and time of capturing each of the images.

The following description deals with the matching section 16. As illustrated in FIG. 1, the matching section 16 includes: a target image obtaining section 101; an applicability determining section 102; a features extracting section 103; a matching use image selecting section 104; a similarity determining section 105; a matching reliability determining section 106; a matching result selecting section 107; and a result outputting section 108. The matching section 16 matches a captured image, serving as a matching target, with a reference face image, serving as a matching reference, and thus outputs a result of the matching.

The target image obtaining section 101 obtains a captured image (target image) serving as a matching target. The target image obtaining section 101 then transmits captured image data representative of the obtained captured image to the applicability determining section 102 and the features extracting section 103. The target image obtaining section 101 can obtain a captured image, serving as a matching target, from the image database 123 or from external equipment via the external equipment connection section 12. The target image obtaining section 101 further obtains, in addition to the captured image, information indicative of a target image time, that is, a time of capturing the captured image, as information about a target image age. The target image obtaining section 101 thus transmits the information indicative of a target image time to the applicability determining section 102. The information about a target image age refers to either the target image age itself or information with which the target image age can be determined.

The applicability determining section 102, with reference to the coefficient table stored in the applicability coefficient table storing section 122, determines by the above-described method an applicability of a reference face image, stored in the reference image database 121, for the captured image obtained from the target image obtaining section 101. In a case where the reference image database 121 stores a plurality of reference face images, the applicability determining section 102 determines an applicability of each of the plurality of reference face images for the captured image. The applicability determining section 102 then transmits, to the matching use image selecting section 104, applicability data representative of (i) the reference face image and (ii) the determined applicability of the reference face image.

The age of a registered person at the time of capturing a target image can be determined from (i) the time of capturing the target image and (ii) the date of birth of the registered person if the date of birth is stored in the reference image database 121. Even if the date of birth is not stored in the reference image database 121, the above age can be determined from (i) the time of capturing the target image and (ii) a combination of: the date and time of capturing a reference face image; and the age of the registered person at the time of capturing the reference image if the combination is stored in the reference image database 121.

The difference between the date and time of capturing a target image and the date and time of capturing a reference face image can be determined from the date and time of capturing the target image and the date and time of capturing the reference face image. Even if the date and time of capturing the reference face image is not stored in the reference image database 121, the date and time of capturing the reference face image can be approximated from a combination of (i) the age of the registered person at the time of capturing the reference face image and (ii) the date of birth of the registered person if the combination is stored in the reference image database 121. The difference between the date and time of capturing a target image and the date and time of capturing a reference face image can thus be determined from the date and time of capturing the target image and the approximated date and time of capturing the reference face image.

The matching use image selecting section 104 selects, from the applicability data obtained from the applicability determining section 102, reference face images, each having an applicability above a threshold, as reference face images for use in matching. The matching use image selecting section 104 thus transmits the reference face images thus selected and their respective applicabilities to the similarity determining section 105. The matching use image selecting section 104 can select a certain number of such reference face images for use in matching for each ID, or select a certain number of reference face images for use in matching for each ID with use of the threshold.

More specifically, the matching use image selecting section 104 can select, as reference face images for use in matching, a number of reference face images in order of applicability which order starts with a reference face image having the highest applicability, the number being required for matching and determined in advance for each ID. The matching use image selecting section 104 can alternatively select, as reference face images for use in matching, a necessary number of reference face images for each ID from among reference face images each having an applicability above the threshold.

With the above arrangement, it is possible to prevent an imbalance in selecting reference face images among different IDs. Specifically, it is possible to prevent a problem such as the following: In a case where the reference image database 121 contains, for a first ID, a large number of reference face images each having a high applicability and, for a second ID, only a small number of reference face images each having a high applicability, the matching use image selecting section 104 selects, as reference face images for use in matching, (i) a large number of reference face images for the first ID, for which the reference image database 121 contains a large number of reference face images each having a high applicability, and (ii) no reference face images for the second ID, for which the reference image database 121 contains only a small number of reference face images each having a high applicability. As such, it is possible to prevent an adverse effect such as the following: Since only reference face images for a particular ID are selected, the matching cannot be carried out accurately.

The features extracting section 103 extracts features of the captured image obtained from the target image obtaining section 101. The features extracting section 103 then transmits, to the similarity determining section 105, features data indicative of the features thus extracted. The features indicate characteristics of a face appearing in a captured image, such as contours of the face, a color of an eye, and a shape of an eye, a nose, and lips.

The similarity determining section 105 determines a similarity between the face of the person appearing in the captured image and the face of a person appearing in a reference face image, on the basis of (i) the features data of the captured image which features data has been obtained from the features extracting section 103 and (ii) the features data of the reference face image which features data has been obtained from the matching use image selecting section 104. The similarity determining section 105 then transmits, to the matching reliability determining section 106, similarity data indicative of the similarity thus determined, (ii) an ID contained in data of the reference face image which data is used to determine the similarity, and (iii) the applicability. In a case where the matching use image selecting section 104 has selected a plurality of reference face images for use in matching, the similarity determining section 105 determines similarity on the basis of (i) features data of each of the plurality of reference face images and (ii) the features data obtained from the features extracting section 103, and then transmits a result of the determination to the matching reliability determining section 106.

The similarity can be determined by a publicly known technique. A description of the determination is thus omitted here.

The matching reliability determining section 106, on the basis of the similarity, the applicability, and the ID obtained from the similarity determining section 105, determines matching reliability of the ID. The matching reliability determining section 106 then transmits, to the matching result selecting section 107, the determined matching reliability together with the ID. The matching reliability is determined by obtaining a weighted average of the similarity for each ID by weighting the similarity with the applicability. The following describes this determination with reference to FIG. 5. FIG. 5 is an explanatory table indicative of (i) an example of similarities and applicabilities for respective IDs and (ii) matching reliabilities. FIG. 5 shows three reference face images A1, A2, and A3 for an ID "A", and indicates that their respective similarities are 0.8, 0.6, and 0.9, and that their respective applicabilities are 0.8, 0.7, and 0.5. FIG. 5 further shows three reference face images B1, B2, and B3 for an ID "B", and indicates that their respective similarities are 0.6, 0.2, and 0.1, and that their respective applicabilities are 0.6, 0.5, and 0.5.

Since a matching reliability of the ID "A" is a weighted average obtained by weighting the corresponding similarities with the corresponding applicabilities, the matching reliability is determined as follows: 0.8×8/20+0.6×7/20+0.9×5/20=0.76. The matching reliability of the ID "B" is determined as follows: 0.6×6/16+0.2×5/16+0.1×5/16=0.32.

The matching result selecting section 107 selects, on the basis of the matching reliabilities and the IDs obtained from the matching reliability determining section 106, an ID having the highest matching reliability. The matching result selecting section 107 then transmits the ID and the matching reliability to the result outputting section 108.

The result outputting section 108 transmits the ID, obtained from the matching result selecting section 107, to the output processing section 18 as a matching result together with the matching reliability.

Figure 6:
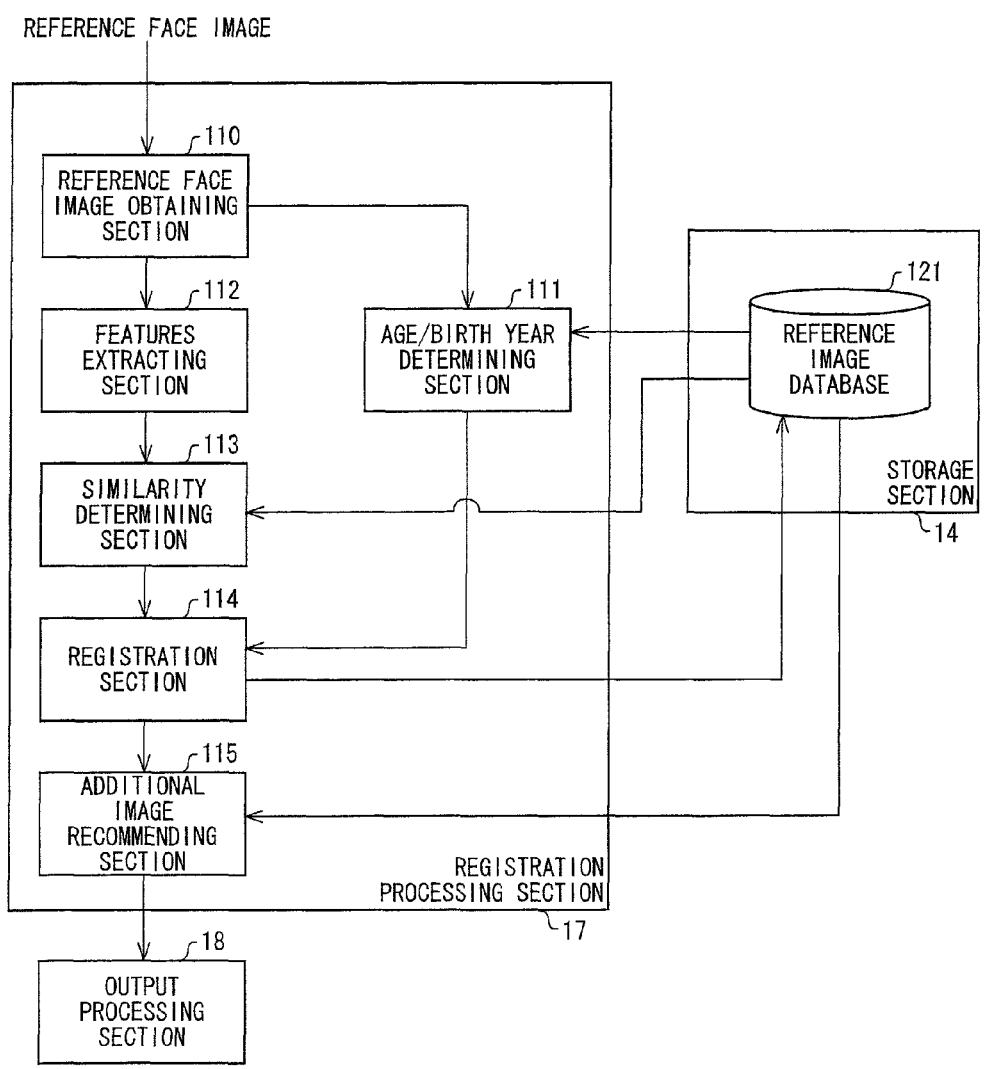
FIG. 6 is a block diagram illustrating main components of a registration processing section in accordance with the embodiment.

The following description deals with the registration processing section 17 with reference to FIG. 6. FIG. 6 is a block diagram illustrating a configuration of the registration processing section 17 according to the present embodiment. As illustrated in FIG. 6, the registration processing section 17 includes: a reference face image obtaining section 110; an age/birth year determining section 111; a features extracting section 112; a similarity determining section 113; a registration section (image registering means) 114; and an image addition recommending section (necessary age outputting means) 115. The registration processing section 17 registers, in the reference image database 121, an image as a reference for use in image matching.

The reference face image obtaining section 110 obtains (i) image data representative of a reference face image and (ii) an ID of a person appearing in the reference face image. The reference face image obtaining section 110 then transmits the image data and the ID to the age/birth year determining section 111 and the features extracting section 112. The image data includes (i) data representative of an image and (ii) data indicative of a date and time of capturing the image. The reference face image obtaining section 110 can obtain the image data from the image database 123 or from external equipment connected to the face matching device 1 via the external equipment connection section 12. The reference face image obtaining section 110 can obtain the ID through an entry made by a user with use of the operation section 13.

The age/birth year determining section 111 determines, on the basis of the image data (reference face image) obtained from the reference face image obtaining section 110, (i) the age of the person (target person) in the image which age occurs at the time of capturing the image and (ii) the year of birth of the person. The age/birth year determining section 111 then transmits, to the registration section 114, the age and the year of birth thus determined. The age/birth year determining section 111 determines the age of the person, the age occurring at the time of capturing the image, from (ii) the date and time of capturing the image and (ii) the date of birth of the person. The age/birth year determining section 111 determines the year of birth of the person from (i) the date and time of capturing the image and (ii) the age of the person at the time of capturing the image. The date of birth of the target person can be obtained (i) from image data stored in the reference image database 121 if the reference image database 121 stores image data of a reference face image for an identical ID, or (ii) through an entry by the user if the target person has not been registered.

The features extracting section 112 extracts features of the image data obtained from the reference face image obtaining section 110. The features extracting section 112 then transmits features data, indicative of the features, to the similarity determining section 113 together with the ID.

The similarity determining section 113 determines similarity on the basis of (i) the features data obtained from the features extracting section 112 and (ii) features data of a reference face image stored in the reference image database 121 and corresponding to the ID obtained as above. The similarity determining section 113 transmits similarity data, indicative of the determined similarity, to the registration section 114 together with the ID.

The registration section 114 first determines whether the similarity obtained from the similarity determining section 113 is not too large or too small for an age difference. If the similarity falls within a predetermined range, the registration section 114 registers the obtained image data in the reference image database 121 as a reference face image, together with (i) the features, (ii) the ID, (iii) the date and time of capturing the image, and (iv) the age and the year of birth obtained from the age/birth year determining section 111. The registration section 114 then transmits data, indicative of completion of registration, to the image addition recommending section 115 together with the ID.

The image addition recommending section 115 determines, upon receipt of the ID and the data indicative of completion of registration from the registration section 114, whether the image addition recommending section 115 can select, from among reference face images each stored in the reference image database 121 and corresponding to the ID, a reference face image having an applicability above a predetermined value, regardless of the age of the person who is assigned the ID and appears in the captured image serving as a matching target. If the image addition recommending section 115 determines that it cannot select such a reference face image, the image addition recommending section 115 transmits, to the output processing section 18, information indicative of an age necessary to be able to select a reference face image with an applicability above the predetermined value, regardless of the age of the person who is assigned the ID and appears in the captured image serving as a matching target.

Suppose, for example, that the reference image database 121 stores, as reference face images, three images of a person, assigned the ID "A", at respective ages of 0, 3, and 12. In a case where, when an image of the person at the age of 9 is newly registered, an image of the person of "A" at the age of 6 is necessary to be able to select a reference face image with an applicability above the predetermined value regardless of the age of the person who corresponds to "A" and appears in a captured image serving as a matching target, the image addition recommending section 115 transmits, to the output processing section 18, information indicating that an image of the person of "A" at the age of 6 is necessary.

The output processing section 18 causes the display section 11 to display a matching result on the basis of the information obtained from either the result outputting section 108 or the image addition recommending section 115. Specifically, the output processing section 18, upon receipt of an ID with a matching reliability not smaller than a threshold from the result outputting section 108, causes the display section 11 to display the ID as a matching result. The output processing section 18, upon receipt of an ID with a matching reliability smaller than the threshold, causes the display section 11 to display, as a matching result, the ID together with an indication that the ID has a low matching reliability.

The output processing section 18, upon receipt of an ID with a low matching reliability, can alternatively (i) ask the user whether the matching result is correct, and (ii) upon acceptance of an operation by the user to indicate that the matching result is correct, prompt the user to register the captured image in the reference image database 121 as a reference face image for the ID.

The output processing section 18, upon receipt of information indicative of a necessary reference image age from the image addition recommending section 115, causes the display section 11 to carry out a display which prompts the user to register an image of the person at the necessary age.

Figure 7:
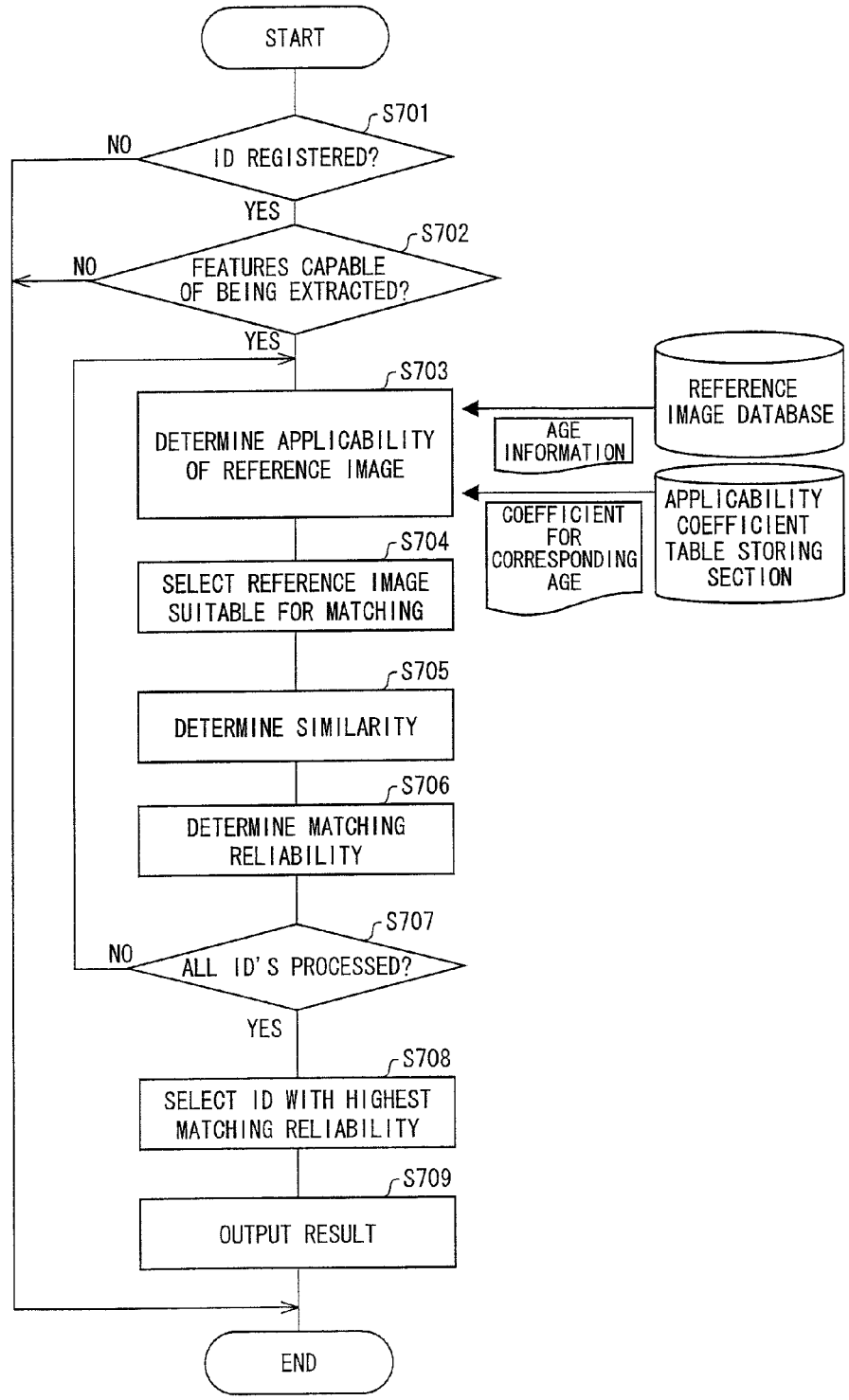
FIG. 7 is a flowchart illustrating how an image matching is carried out through steps in accordance with the embodiment.

With reference to FIG. 7, the following description deals with how image matching is carried out through steps. FIG. 7 is a flowchart illustrating how the face matching device 1 carries out image matching. First, the target image obtaining section 101 obtains image data (captured image data) of an image (captured image) of a target person which image serves as a matching target, and then determines whether the reference image database 121 stores registered reference face images (S701).

If the reference image database 121 stores no registered reference face images (NO in S701), the matching process ends there. If the reference image database 121 stores registered reference face images (YES in S701), the features extracting section 103 attempts to extract features of the captured image obtained from the target image obtaining section 101 (S702).

If the features extracting section 103 cannot extract features (NO in S702), the matching process ends there. If the features extracting section 103 has extracted features (YES in S702), the applicability determining section 102 determines an applicability of each of the reference face images, stored in the reference image database 121, with reference to an applicability coefficient table stored in the applicability coefficient table storing section 122 (S703).

Next, the matching use image selecting section 104 selects, as a reference face image for use in matching, a reference face image with an applicability, determined by the applicability determining section 102, which exceeds a predetermined value (S704). Then, the similarity determining section 105 determines a similarity between (i) the captured image and (ii) the reference face image selected by the matching use image selecting section 104 (S705).

The steps S703 through S705 are carried out for each reference face image for an identical ID.

Next, the matching reliability determining section 106 determines a matching reliability from the applicability and the similarity (S706).

The steps S703 through S706 are carried out for all IDs of reference face images stored in the reference image database 121 (S707). When the steps S703 through S706 have been carried out for all the IDs (YES in S707), the matching result selecting section 107 selects, as a matching result, an ID corresponding to a reference face image having a highest matching reliability (S708). The result outputting section 108 outputs, as a matching result, the matching result thus selected (S709). The matching process is thus completed.

If no reference face image has an applicability above the predetermined value when the matching use image selecting section 104 is to select a reference face image for use in matching in the S704, the face matching device 1 can inform a user that no reference face image has an applicability above the predetermined value.

If (i) a reference face image for the ID selected in the S709 has a matching reliability which does not exceed a predetermined value, and (ii) the reference image database 121 stores no reference face image in which a person (reference person) appears whose age is close to the age of a person (target person) appearing in the captured image, the face matching device 1 can prompt the user to register the captured image as a reference face image so that the captured image is registered as a reference face image through an operation by the user.

If no reference face image has an applicability above the predetermined value in the S704, the face matching device 1 can (i) carry out matching with use of a reference face image having an applicability which does not exceed the predetermined value, (ii) ask the user whether a result of the matching is correct, and (iii) upon acceptance of an instruction from the user which indicates that the matching result is correct, register the captured image as a reference face image for the target person.

More specifically, if no reference face image has an applicability above the predetermined value in the S704, the matching use image selecting section 104 selects, as a reference face image for use in matching, a reference face image having an applicability which does not exceed the predetermined value. Then, the steps S705 through S708 are carried out with respect to the reference face image thus selected. In the S709, the result outputting section 108 outputs a result to ask the user whether a matching result is correct. When the result outputting section 108 accepts an input indicating that the matching result is correct, the registration section 114 registers, in the reference image database 121, the image (captured image) of the target person as a reference face image for the target person.

Figure 8:
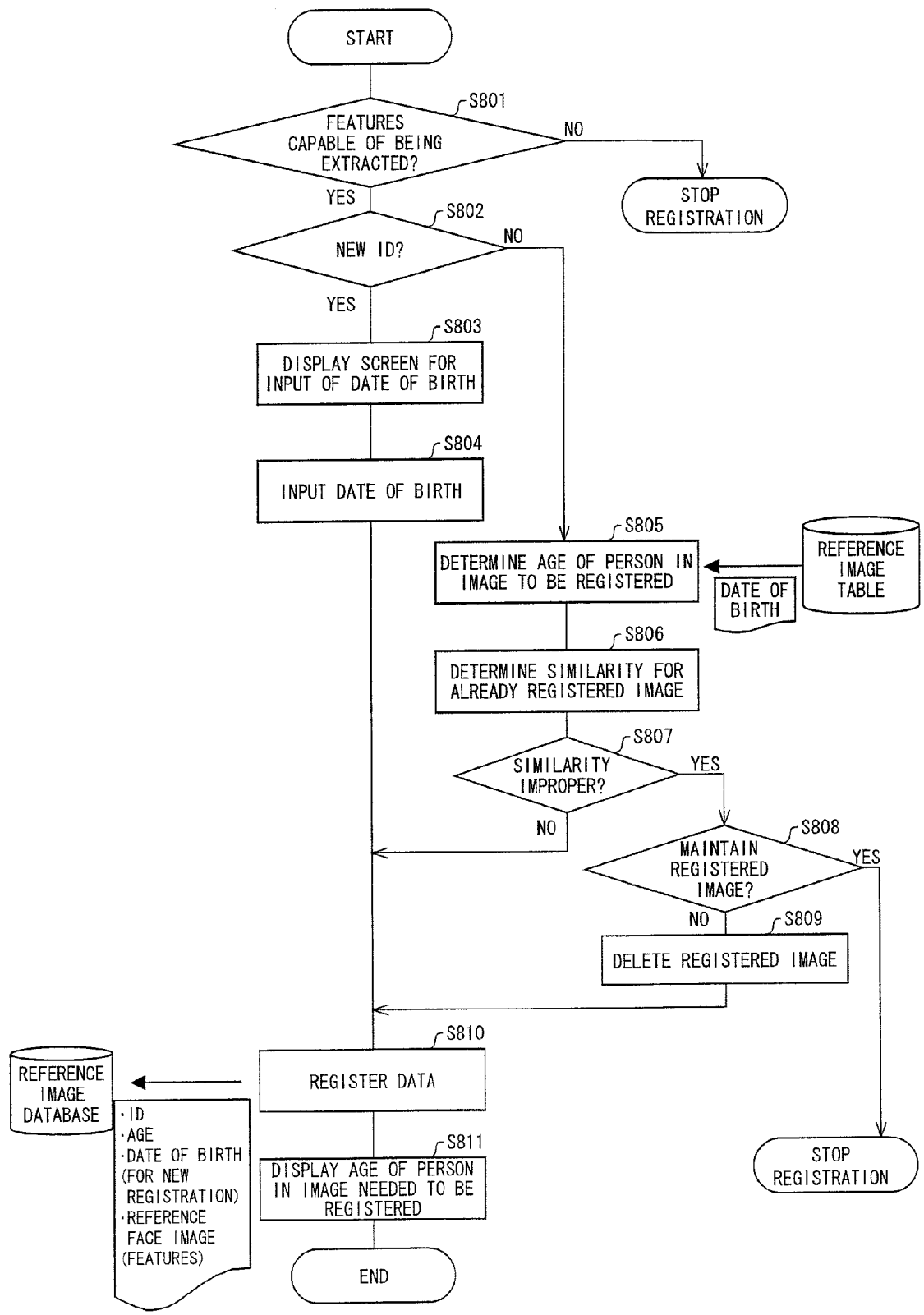
FIG. 8 is a flowchart illustrating how a reference face image is registered in a reference image database through steps in accordance with the embodiment.

With reference to FIG. 8, the following description deals with how a reference face image is registered through steps. FIG. 8 is a flowchart illustrating how a reference face image is registered in the reference image database 121.

First, the reference face image obtaining section 110 obtains a reference face image. The features extracting section 112 then attempts to extract features of the reference face image obtained by the reference face image obtaining section 110 (S801). If the features extracting section 112 cannot extract features (NO in S801), the process of registering a reference face image ends there. If the features extracting section 112 has extracted features (YES in S801), the registration processing section 17 determines whether an ID corresponding to the reference face image has been registered in the reference image database 121 (S802). If the ID has not been registered in the reference image database 121 (YES in S802), the registration processing section 17 causes the display section 11 to display a screen for input of a date of birth (S803), and thus accepts from a user an input of the date of birth of a person indicated by the ID (S804).

When the user has inputted the date of birth, the registration processing section 17 newly registers the reference face image (S810).

If the ID corresponding to the reference face image has already been registered in the reference image database 121 (NO in S802), the age/birth year determining section 111 determines the age of the person (target person) in the reference face image on the basis of (i) an already registered date of birth and (ii) a date and time of capturing the reference face image which date and time is included in image data representing the reference face image and obtained from the reference face image obtaining section 110 (S805). In a case where a captured image is an image captured in real time, the date and time of capturing the reference face image can be determined from data indicative of a current time, which data is managed by the face matching device 1. The similarity determining section 113 then determines a similarity between (i) the reference face image to be newly registered and (ii) a reference face image already registered in the reference image database 121 and corresponding to the ID for the reference face image to be newly registered (S806). Next, the registration section 114 determines whether the similarity is improper, on the basis of (i) the similarity determined by the similarity determining section 113 and (ii) an age difference between the person appearing in the reference face image to be newly registered and the person appearing in the already registered reference face image (S807).

Whether a similarity is improper or not is determined from a relation between an age difference and the similarity. Specifically, a small similarity with a large age difference is determined as not improper because such a case is reasonably possible. A small similarity with a small age difference is, however, determined as improper because such a case is normally impossible. Further, a similarity above a predetermined value with a small age difference is also determined as improper. This is because only a small advantage is possibly achieved by registering a plurality of similar images which show respective persons whose ages are close to one another.

If the registration section 114 determines that the similarity between the above two images is improper (YES in S807), the registration section 114 asks the user to determine whether to maintain the already registered reference face image or to register the new reference face image (S808). If the user chooses to maintain the already registered reference face image (YES in S808), the registration process ends there. If the user chooses not to maintain the already registered reference face image (NO in S808), the registration processing section 17 deletes the reference face image registered in the reference image database 121 (S809) and registers the new reference face image (S810).

If the registration section 114 determines that the similarity between the two images is not improper (NO in S807), the registration processing section 17 registers the new reference face image (S810).

After the new reference face image has been registered, the image addition recommending section 115 determines whether a reference face image, registered in the reference image database 121 and corresponding to the ID for the newly registered reference face image, can be selected as a reference face image with an applicability above a threshold regardless of the age of a person appearing in a captured image. If the image addition recommending section 115 determines that to be able to select the above reference face image as a reference face image with an applicability above the threshold regardless of the age of a person appearing in a captured image, it is necessary to obtain a reference face image of the person of the identical ID at another age, the image addition recommending section 115 prompts the user to register a reference face image of the person of the ID at a necessary age (S811).

The process of registering a reference face image is thus completed.

The above embodiment selects a reference face image with an applicability above a threshold as a reference face image for use in matching. The embodiment can alternatively be arranged to select any reference face image as a reference face image for use in matching without using a threshold for the applicability.

The face matching device 1 can be arranged to inform the user, in a case where a matching reliability is below a threshold, that the reliability is low. In a case where the user determines despite a matching reliability below a threshold that an outputted matching result is correct, the face matching device 1 can newly register, as a reference face image, a captured image used for the matching.

The face matching device of the present invention may be arranged as follows: A face matching device for (i) matching a target face image, which is a face image as a target, with a reference face image, which is a face image, as a reference, of a registered person, and (ii) outputting a result of the matching, the face matching device including: obtaining means for obtaining a sum set of (i) target image age related information, which is either a target image age, that is, an age of the registered person at a target image time, which is a time of capturing the target face image, or information with which the target image age can be determined, and (ii) reference image age related information, which is either a reference image age, that is, an age of the registered person at a reference image time, which is a time of capturing each of a plurality of reference face images, or information with which the reference image age can be determined; and selecting means for selecting the reference face image for use in the matching on the basis of the target image age related information and the reference image age related information, of which the sum set is obtained by the obtaining means.

The face matching device further including a storage section for storing (i) the reference image time of each of the plurality of reference face images and (ii) a time of birth of the registered person, wherein: the target image age related information includes the target image time and the time of birth of the registered person; and the reference image age related information includes the reference image time of each of the plurality of reference face images and the time of birth of the registered person.

The face matching device further including a storage section for storing (i) the reference image age of each of the plurality of reference face images and (ii) a time of birth of the registered person, wherein: the target image age related information includes the target image time and the time of birth of the registered person; and the reference image age related information includes the reference image age of each of the plurality of reference face images.

The face matching device further including a storage section for storing the reference image time and the reference image age of each of the plurality of reference face images, wherein: the target image age related information includes the target image time the reference image time and the reference image age of each of the plurality of reference face images; and the reference image age related information includes the reference image age of each of the plurality of reference face images.

As described above, a face matching device of the present invention includes an age/birth year determining section 111 for (i) determining, on the basis of the time of capturing each reference face image and the time of birth of the registered person, a reference image age, which is the age of the registered person appearing in the reference face image, and (ii) causing the storage section to store the determined reference image age.

According to the above arrangement, the age/birth year determining section 111 determines a reference image age of the registered person from (i) a year, month, and date of capturing each reference face image and (ii) the date of birth of the registered person, and causes the storage section to store the reference image age. With the arrangement, it is possible to eliminate the need for the user to manually enter the reference image age.

As described above, a face matching device of the present invention is a face matching device for matching (i) a target face image, included in a captured image and serving as a matching target, with (ii) a reference face image, registered in a reference image database and serving as a face image for reference, the reference image database being capable of (i) storing a plurality of reference face images for each registered person and further (ii) storing, for each of the plurality of reference face images, a reference face image capturing time, which is a time of capturing said each of the plurality of reference face images, the face matching device including: obtaining means for obtaining a target face image capturing time, which is a time of capturing the target face image; and selecting means for selecting the reference face image for use in the matching on a basis of (i) the target face image capturing time obtained by the obtaining means and (ii) the reference face image capturing time stored in the reference image database.

A method of the present invention for controlling a face matching device is a method for controlling a face matching device for matching (i) a target face image, included in a captured image and serving as a matching target, with (ii) a reference face image, registered in a reference image database and serving as a face image for reference, the reference image database being capable of (i) storing a plurality of reference face images for each registered person and further (ii) storing, for each of the plurality of reference face images, a reference face image capturing time, which is a time of capturing said each of the plurality of reference face images, the method including the steps of: (a) obtaining a target face image capturing time, which is a time of capturing the target face image; and (b) selecting the reference face image for use in the matching on a basis of (i) the target face image capturing time obtained in the step (a) and (ii) the reference face image capturing time stored in the reference image database.

According to the arrangement and method above, the reference face image for use in the matching is selected on the basis of (i) the target face image capturing time, that is, the time of capturing the target face image obtained and (ii) the reference face image capturing time stored in the reference image database.

With the arrangement, it is possible to select the reference face image for use in the matching while taking into consideration the time of capturing the target face image and the time of capturing each of the reference face images. A reference face image captured at a time close to the time of capturing the target face image includes an image of a registered person whose age is close to an age of the registered person at the time of capturing the target face image. As such, it is possible to carry out more accurate matching by selecting a reference face image captured at a time close to the time of capturing the target face image.

Suppose, for example, that the reference image database stores, as reference face images, images of two persons, namely A (born in 1980) and B (born in 1970), and that the reference image database specifically stores (i) three face images of A, that is, one captured in 1985 (A1), one captured in 1990 (A2), and one captured in 1998 (A3), and (ii) three face images of B, that is, one captured in 1988 (B1), one captured in 1991 (B2), and one captured in 19998 (B3). Suppose further that a target image shows the person A and was captured in 1998 (when the person A was 18 years old). If the target image were matched with all reference face images, the target image might erroneously be matched with the face image B1, in which the person B at the age of 18 appears.

In contrast, in a case where reference face images whose respective capturing times are close to the time of capturing the target image are selected as reference face image for use in matching, the face matching device will select the face images A3 (the person A at the age of 18) and B3 (the person B at the age of 28) as reference face images. Thus, there is only a low possibility that the face matching device will determine that the person A at the age of 18 is identical to the person B at the age of 28. As a result, it is possible to carry out accurate matching.

The face matching device of the present invention may be arranged such that the reference image database is further capable of storing, for each of the plurality of reference face images, a reference image age, which is an age of the registered person at the time of capturing said each of the plurality of reference face images; and the selecting means selects the reference face image for use in the matching with additional use of the reference image age.

According to the above arrangement, it is possible to select a reference face image whose reference image age is suitable for the age of the registered person at the time of capturing the captured image.

The term "age" as used herein can not only specify the number of years having elapsed after birth, but also further specify the number of months and days.

Various information items described herein preferably specify years, months, and days. Such information items can further specify clock times, or simply specify only years and months.

The face matching device of the present invention may be arranged such that the reference image database is further capable of storing a time of birth of the registered person; and the selecting means selects the reference face image for use in the matching with additional use of the time of birth.

In order to solve the above problem, a face matching device of the present invention is a face matching device for matching (i) a target face image, included in a captured image and serving as a matching target, with (ii) a reference face image, registered in a reference image database and serving as a face image for reference, the reference image database being capable of (i) storing a plurality of reference face images for each registered person and further (ii) storing a time of birth of the registered person and a reference image age, which is an age of the registered person at a time of capturing each of the plurality of reference face images, the face matching device including: obtaining means for obtaining a target face image capturing time, which is a time of capturing the target face image; and selecting means for selecting the reference face image for use in the matching on a basis of (i) the target face image capturing time obtained by the obtaining means and (ii) the time of birth and the reference image age both stored in the reference image database.

A method of the present invention for controlling a face matching device method for controlling a face matching device for matching (i) a target face image, included in a captured image and serving as a matching target, with (ii) a reference face image, registered in a reference image database and serving as a face image for reference, the reference image database being capable of (i) storing a plurality of reference face images for each registered person and further (ii) storing a time of birth of the registered person and a reference image age, which is an age of the registered person at a time of capturing each of the plurality of reference face images, the method including the steps of: (a) obtaining a target face image capturing time, which is a time of capturing the target face image; and (b) selecting the reference face image for use in the matching on a basis of (i) the target face image capturing time obtained in the step (a) and (ii) the time of birth and the reference image age both stored in the reference image database.

According to the arrangement and method above, the reference face image for use in the matching is selected on the basis of (i) the target face image capturing time, that is, the time of capturing the target face image obtained and (ii) time of birth of the registered person and the reference image age both stored in the reference image database.

The age of the registered person at the time of capturing the target face image can be determined from the time of birth of the registered person. As such, it is possible to select a reference face image on the basis of (i) the age of the registered person at the time of capturing the target face image and (ii) the reference image age.

With the arrangement, it is possible to select, while taking into consideration the age of the target person at the time of capturing the target face image, a reference face image whose reference image age is suitable for the age of the target person at the time of capturing the target face image. By selecting a reference face image whose reference image age is suitable for the age of the target person at the time of capturing the target face image, it is possible to carry out more accurate matching.

The face matching device of the present invention may preferably further include: applicability determining means for determining, on a basis of a difference between the target face image capturing time obtained by the obtaining means and the reference face image capturing time stored in the reference image database, an applicability indicative of how suitably said each of the plurality of reference face images is applicable in the matching with the target face image included in the captured image, wherein: the reference face image selected by the selecting means has an applicability, determined by the applicability determining means, which exceeds a predetermined threshold.

According to the above arrangement, the applicability determining means determines an applicability on the basis of a difference between (i) the target face image capturing time obtained by the obtaining means and (ii) the reference face image capturing time stored in the reference image database. The selecting means thus selects a reference face image with an applicability, determined by the applicability determining means, which exceeds the threshold.

The applicability is determined on the basis of the difference between (i) the target face image capturing time, that is, the time of capturing the target face image, and (ii) the reference face image capturing time, that is, the time of capturing each reference face image. As such, a reference face image for use in matching is selected with a period between the target face image capturing time and the reference face image capturing time into consideration. As a result, it is possible to carry out more accurate matching.

The face matching device of the present invention may further include: target image age determining means for determining, on a basis of (i) the target face image capturing time obtained by the obtaining means and (ii) the reference face image capturing time and the reference image age both stored in the reference image database, a target image age, which is an age of the registered person at the time of capturing the target face image; and applicability determining means for determining, on a basis of (i) a difference between the target face image capturing time obtained by the obtaining means and the reference face image capturing time stored in the reference image database and (ii) the target image age determined by the target image age determining means, an applicability indicative of how suitably said each of the plurality of reference face images is applicable in the matching with the target face image included in the captured image, wherein: the reference face image selected by the selecting means has an applicability, determined by the applicability determining means, which exceeds a predetermined threshold.

According to the above arrangement, the applicability is determined on the basis of (i) a difference between the target face image capturing time obtained by the obtaining means and the reference face image capturing time and (ii) the target image age. The selecting means thus selects a reference face image with an applicability, determined by the applicability determining means, which exceeds the threshold.

The applicability is determined on the basis of (i) the difference between the target face image capturing time, that is, the time of capturing the target image, and the reference face image capturing time, that is, the time of capturing each reference face image, and (ii) the target image age. The applicability is thus determined with (i) the target image age and (ii) a period between the target face image capturing time and the reference face image capturing time into consideration.

With the arrangement, it is possible to use, for matching with the target face image, only a reference face image having an applicability above the threshold, i.e., to use, with (i) the target image age and (ii) the period between the target face image capturing time and the reference face image capturing time into consideration, a reference face image whose level of applicability in matching with the target face image exceeds a threshold. As a result, it is possible to carry out more accurate matching.

The face matching device of the present invention may further include: target image age determining means for determining, on a basis of (i) the target face image capturing time obtained by the obtaining means and (ii) the time of birth stored in the reference image database, a target image age, which is an age of the registered person at the time of capturing the target face image; and applicability determining means for determining, on a basis of (i) a difference between the target face image capturing time obtained by the obtaining means and the reference face image capturing time stored in the reference image database and (ii) the target image age determined by the target image age determining means, an applicability indicative of how suitably said each of the plurality of reference face images is applicable in the matching with the target face image included in the captured image, wherein: the reference face image selected by the selecting means has an applicability, determined by the applicability determining means, which exceeds a predetermined threshold.

The face matching device of the present invention may further include: target image age determining means for determining, on a basis of (i) the target face image capturing time obtained by the obtaining means and (ii) the time of birth stored in the reference image database, a target image age, which is an age of the registered person at the time of capturing the target face image; and applicability determining means for determining, on a basis of a difference between (i) the reference image age stored in the reference image database and (ii) the target image age determined by the target image age determining means, an applicability indicative of how suitably said each of the plurality of reference face images is applicable in the matching with the target face image included in the captured image, wherein: the reference face image selected by the selecting means has an applicability, determined by the applicability determining means, which exceeds a predetermined threshold.

The face matching device of the present invention may preferably be arranged such that the applicability changes at a rate with respect to the difference between the target face image capturing time and the reference face image capturing time which rate is higher as the target image age is earlier.

According to the above arrangement, the applicability changes at a rate with respect to a period between (i) the target face image capturing time, that is, the time of capturing the target face image, and (ii) the reference face image capturing time, that is, the time of capturing each reference face image serving as a matching reference which rate is higher as the target image age, that is, the age of the registered person at the time of capturing the target face image, is earlier.

With the arrangement, the applicability changes greatly with respect to the difference between the target face image capturing time and the reference face image capturing time for a period during which a facial change can be large, such as a period during which a newborn baby becomes a toddler. On the other hand, the applicability does not change greatly with respect to the difference between the target face image capturing time and the reference face image capturing time for a period during which a facial change is small for time elapse, such as a period after the person has grown up.

As such, the applicability changes greatly for a period during which a facial change (change due to aging) is large for time elapse, whereas the applicability does not change greatly for a period during which such a change due to aging is small for time elapse. Thus, it is possible to determine the applicability of a reference face image in more detail.

It follows that it is possible to (i) carry out matching with use of a reference face image whose applicability has been determined in more detail, and consequently (ii) carry out accurate matching in which a facial change due to aging is taken into consideration in more detail.

The face matching device of the present invention may further include: weighted matching result determining means for determining a weighted matching result obtained by weighting, with the applicability of the reference face image by the selecting means, a result of matching the reference face image with the target face image.

According to the above arrangement, the weighted matching result determining means determines a weighted matching result obtained by weighting, with the applicability of the reference face image, a result of matching (i) the reference face image selected by the selecting means with (ii) the target face image. With the arrangement, the result is determined as weighted (i) heavily for matching with use of a reference face image having a high applicability and (ii) lightly for matching with use of a reference face image having a low applicability. As a result, it is possible to output more accurate matching result.

The face matching device of the present invention may further include: necessary age outputting means for (i) determining, from the reference image age for each of the plurality of reference face images stored in the reference image database, a target image age range within which the applicability is not below the threshold, (ii) determining a reference image age range within which the applicability is not below the threshold in a case where the target image age does not fall within the determined target image age range, and (iii) outputting the determined reference image age range.

According to the above arrangement, the necessary age outputting means (i) determines, from the reference image age for each of the plurality of reference face images stored in the reference image database, a target image age range within which the applicability is not below the threshold, (ii) determines a reference image age range within which the applicability is not below the threshold in a case where the target image age does not fall within the determined target image age range, and (iii) outputs the determined reference image age range.

With the arrangement, a device to which the reference image age range has been outputted can recognize a reference image age necessary to select a reference face image with an applicability not below a threshold regardless of the target image age of the registered person.

As such, in a case where, for example, the device to which the reference image age range has been outputted informs the user of a reference image age necessary for the selecting means to select a reference face image with an applicability not below the threshold regardless of the target image age, the user can recognize the reference image age necessary for the selecting means to select a reference face image with an applicability not below the threshold regardless of the target image age. With the arrangement, it is possible to prompt the user to register a reference face image with the above reference image age.

In a case where the user has registered such a reference face image that the user has been prompted to register, the selecting means can select a reference face image with an applicability not below the threshold regardless of the target image age of the registered person at the time of capturing the target face image. As a result, it is possible to carry out more accurate matching.

The face matching device of the present invention may further include: applicability determining means for determining, on a basis of a difference between the target face image capturing time obtained by the obtaining means and the reference face image capturing time stored in the reference image database, an applicability indicative of how suitably said each of the plurality of reference face images is applicable in the matching with the target face image included in the captured image, wherein: the reference face image selected by the selecting means, in a case where the applicability, determined by the applicability determining means, of none of the plurality of reference face images exceeds the threshold, has an applicability which does not exceed the threshold; the face matching device further including: inquiring means for inquiring whether a result of the matching is correct; and image registering means for registering, upon acceptance by the inquiring means of an input indicating that the result is correct, the target face image as a reference face image.

According to the above arrangement, the selecting means selects, if none of the reference face images has an applicability above the threshold, a reference face image having an applicability which does not exceed the threshold, and the image registering means registers, in a In a case where the matching result is correct, the target face image as a reference face image.

With the arrangement, the image registering means registers, if none of the reference face images registered has an applicability above the threshold for the target face image, the target face image as a reference face image. As such, it is possible after the registration to use a reference face image, having an applicability which is high as compared to before, so as to carry out matching with respect to a face image whose capturing time is close to the time of capturing the target face image. As a result, it is possible to carry out more accurate matching.

In order to solve the above problem, an electronic device of the present invention includes: one of the above face matching devices; and informing means for providing a user with a notification in a case where the applicability of none of the plurality of reference face images exceeds the threshold for the target face image.

According to the above arrangement, the informing means provides the user with a notification if none of the reference face images has an applicability above the threshold. As such, it is possible for the user to recognize that none of the reference face images has an applicability above the threshold.

Each of the face matching devices can be formed of a computer. In this case, the present invention encompasses in its scope a program for controlling a face matching device which program causes the computer to function as the face matching device by causing the computer to operate as each of the above means.

The present invention is not limited to the description of the embodiment above, but may be altered in various ways by a skilled person within the scope of the claims. Any embodiment based on a combination of technical means appropriately altered within the scope of the claims is also encompassed in the technical scope of the present invention.

The embodiment and concrete examples of implementation discussed in the foregoing detailed explanation serve solely to illustrate the technical details of the present invention, which should not be narrowly interpreted within the limits of such an embodiment and concrete examples, but rather may be applied in many variations within the spirit of the present invention, provided that such variations do not exceed the scope of the patent claims set forth below.

Finally, the blocks of the face matching device 1 may be realized by way of hardware or software as executed by a CPU (central processing unit) as described in the following paragraphs. The above blocks particularly refer to (i) the matching section 16, the registration processing section 17, and the output processing section 18 of the control section 10, (ii) the target image obtaining section 101, the applicability determining section 102, the features extracting section 103, the matching use image selecting section 104, the similarity determining section 105, the matching reliability determining section 106, the matching result selecting section 107, and the result outputting section 108 of the matching section 16, and (iii) the reference face image obtaining section 110, the age/birth year determining section 111, the features extracting section 112, the similarity determining section 113, the registration section 114, and the image addition recommending section 115 of the registration processing section 17.

The face matching device 1 includes a CPU and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The objective of the present invention can also be achieved by mounting to the face matching device 1 a computer-readable storage medium containing control program code (executable program, intermediate code program, or source program) for the face matching device 1, which is software realizing the aforementioned functions, in order for the computer (or CPU, MPU [microprocessor unit]) to retrieve and execute the program code contained in the storage medium.

The storage medium may be, for example, a tape, such as a magnetic tape or a cassette tape; a magnetic disk, such as a floppy (registered trademark) disk or a hard disk, or an optical disk, such as CD-ROM (compact disc read-only memory)/MO (magneto-optical)/MD (Mini Disc)/DVD (digital versatile disk)/CD-R (CD Recordable); a card, such as an IC card (memory card) or an optical card; or a semiconductor memory, such as a mask ROM/EPROM (erasable programmable read-only memory)/EEPROM (electrically erasable and programmable read-only memory)/flash ROM.

The face matching device 1 may be arranged to be connectable to a communications network so that the program code may be delivered over the communications network. The communications network is not limited in any particular manner, and may be, for example, the Internet, an intranet, extranet, LAN (local area network), ISDN (integrated services digital network), VAN (value-added network), CATV (community antenna television) communications network, virtual dedicated network (virtual private network), telephone line network, mobile communications network, or satellite communications network. The transfer medium which makes up the communications network is not limited in any particular manner, and may be, for example, wired line, such as IEEE (institute of electrical and electronic engineers) 1394, USB, electric power line, cable TV line, telephone line, or ADSL (asynchronous digital subscriber loop) line; or wireless, such as infrared radiation (IrDA [infrared data association], remote control), Bluetooth (registered trademark), 802.11 wireless, HDR (high data rate), mobile telephone network, satellite line, or terrestrial digital network. The present invention can be achieved by use of a computer data signal embodied in a carrier wave which signal is formed by electronic transmission of the program code.

INDUSTRIAL APPLICABILITY

The present invention makes it possible to carry out accurate matching, for identification of a person, with respect to face images of various ages with use of face images of ages which are individually close to such various ages. The present invention is thus applicable to a device which (i) classifies by person numerous face images which show respective persons of various ages, and (ii) selects, from such numerous face images, a face image for matching which face image shows a particular person.

REFERENCE SIGNS LIST 1 face matching device (electronic device)
10 control section
11 display section (informing means)
12 external equipment connection section
13 operation section
14 storage section
16 matching section
17 registration processing section
18 output processing section
101 target image obtaining section (obtaining means)
102 applicability determining section (applicability determining means; target image age determining means)
103 features extracting section
104 matching use image selecting section (selecting means)
105 similarity determining section
106 matching reliability determining section (weighted matching result determining means)
107 matching result selecting section
108 result outputting section (inquiring means)
110 reference face image obtaining section
111 age/birth year determining section
112 features extracting section
113 similarity determining section
114 registration section (image registering means)

115 image addition recommending section (necessary age outputting means)
121 reference image database
122 applicability coefficient table storing section
123 image database

The invention claimed is:

1. A face matching device for matching (i) a target face image, included in a captured image and serving as a matching target, with (ii) a reference face image, registered in a reference image database and serving as a face image for reference, the reference image database being capable of (i) storing a plurality of reference face images for each registered person and further (ii) storing (a) for each of the plurality of reference face images, a reference face image capturing time, which is a time of capturing said each of the plurality of reference face images, and (b) a reference image age, which is an age of the registered person at the reference face image capturing time, the face matching device comprising:

obtaining means for obtaining a target face image capturing time, which is a time of capturing the target face image;

selecting means for selecting the reference face image for use in the matching on a basis of (i) the target face image capturing time obtained by the obtaining means and (ii) the reference face image capturing time stored in the reference image database;

a coefficient storage section which stores a coefficient corresponding to a general age of the registered person, the coefficient (i) being at a maximum in a case where the general age is 0, (ii) decreasing as the general age increases, and (iii) changing at a rate which is higher as the general age is earlier;

target image age determining means for determining, on a basis of (i) the target face image capturing time obtained by the obtaining means and (ii) the reference face image capturing time and the reference image age both stored in the reference image database, a target image age, which is an age of the registered person at the time of capturing the target face image; and applicability determining means for determining, by multiplying (i) a difference between the target face image capturing time obtained by the obtaining means and the reference face image capturing time stored in the reference image database by (ii) a value of the coefficient stored in the coefficient storage section which value corresponds to the target image age determined by the target image age determining means, an applicability indicative of how suitably said each of the plurality of reference face images is applicable in the matching with the target face image included in the captured image, the reference face image selected by the selecting means having an applicability, determined by the applicability determining means, which exceeds a predetermined threshold.

2. A face matching device for matching (i) a target face image, included in a captured image and serving as a matching target, with (ii) a reference face image, registered in a reference image database and serving as a face image for reference, the reference image database being capable of (i) storing a plurality of reference face images for each registered person and further (ii) storing (a) for each of the plurality of reference face images, a reference face image capturing time, which is a time of capturing said each of the plurality of reference face images, and (b) a time of birth of the registered person, the face matching device comprising:

obtaining means for obtaining a target face image capturing time, which is a time of capturing the target face image;

selecting means for selecting the reference face image for use in the matching on a basis of (i) the target face image capturing time obtained by the obtaining means and (ii) the reference face image capturing time stored in the reference image database;

a coefficient storage section which stores a coefficient corresponding to a general age of the registered person, the coefficient (i) being at a maximum in a case where the general age is 0, (ii) decreasing as the general age increases, and (iii) changing at a rate which is higher as the general age is earlier;

target image age determining means for determining, on a basis of (i) the target face image capturing time obtained by the obtaining means and (ii) the time of birth stored in the reference image database, a target image age, which is an age of the registered person at the time of capturing the target face image; and applicability determining means for determining, by multiplying (i) a difference between the target face image capturing time obtained by the obtaining means and the reference face image capturing time stored in the reference image database by (ii) a value of the coefficient stored in the coefficient storage section which value corresponds to the target image age determined by the target image age determining means, an applicability indicative of how suitably said each of the plurality of reference face images is applicable in the matching with the target face image included in the captured image, the reference face image selected by the selecting means having an applicability, determined by the applicability determining means, which exceeds a predetermined threshold.

3. A face matching device for matching (i) a target face image, included in a captured image and serving as a matching target, with (ii) a reference face image, registered in a reference image database and serving as a face image for reference, the reference image database being capable of (i) storing a plurality of reference face images for each registered person and further (ii) storing (a) a time of birth of the registered person, and (b) a reference image age, which is an age of the registered person at the reference face image capturing time, the face matching device comprising:

obtaining means for obtaining a target face image capturing time, which is a time of capturing the target face image;

selecting means for selecting the reference face image for use in the matching on a basis of (i) the target face image capturing time obtained by the obtaining means and (ii) the time of birth and the reference image age both stored in the reference image database;

a coefficient storage section which stores a coefficient corresponding to a general age of the registered person, the coefficient (i) being at a maximum in a case where the general age is 0, (ii) decreasing as the general age increases, and (iii) changing at a rate which is higher as the general age is earlier;

target image age determining means for determining, on a basis of (i) the target face image capturing time obtained by the obtaining means and (ii) the time of birth stored in the reference image database, a target image age, which is an age of the registered person at the time of capturing the target face image; and applicability determining means for determining, by multiplying (i) a difference between the target image age determined by the target image age determining means and the reference image age stored in the reference image database by (ii) a value of the coefficient stored in the coefficient storage section which value corresponds to the target image age determined by the target image age determining means, an applicability indicative of how suitably said each of the plurality of reference face images is applicable in the matching with the target face image included in the captured image, the reference face image selected by the selecting means having an applicability, determined by the applicability determining means, which exceeds a predetermined threshold.

4. The face matching device according to claim 1, further comprising:

weighted matching result determining means for determining a weighted matching result obtained by weighting, with the applicability of the reference face image by the selecting means, a similarity serving as a result of matching the reference face image with the target face image.

5. The face matching device according to claim 1, further comprising:

necessary age outputting means for (i) determining, from the reference image age for each of the plurality of reference face images stored in the reference image database, a target image age range within which the applicability is not below the threshold, (ii) determining a reference image age range within which the applicability is not below the threshold in a case where the target image age does not fall within the determined target image age range, and (iii) outputting the determined reference image age range.

6. The face matching device according to claim 1, wherein:

the reference face image selected by the selecting means, in a case where the applicability, determined by the applicability determining means, of none of the plurality of reference face images exceeds the threshold, has an applicability which does not exceed the threshold;

the face matching device further comprising:

inquiring means for inquiring whether a result of the matching is correct; and image registering means for registering, upon acceptance by the inquiring means of an input indicating that the result is correct, the target face image as a reference face image.

7. An electronic device comprising:

the face matching device recited in claim 1; and informing means for providing a user with a notification in a case where the applicability of none of the plurality of reference face images exceeds the threshold for the target face image.

8. A method for controlling a face matching device for matching (i) a target face image, included in a captured image and serving as a matching target, with (ii) a reference face image, registered in a reference image database and serving as a face image for reference, the reference image database being capable of (i) storing a plurality of reference face images for each registered person and further (ii) storing (a) for each of the plurality of reference face images, a reference face image capturing time, which is a time of capturing said each of the plurality of reference face images, and (b) a reference image age, which is an age of the registered person at the reference face image capturing time, the face matching device including a coefficient storage section which stores a coefficient corresponding to a general age of the registered person, the coefficient (i) being at a maximum in a case where the general age is 0, (ii) decreasing as the general age increases, and (iii) changing at a rate which is higher as the general age is earlier, the method comprising the steps of:

(a) obtaining a target face image capturing time, which is a time of capturing the target face image;

(b) determining, on a basis of (i) the target face image capturing time obtained in the step (a) and (ii) the reference face image capturing time and the reference image age both stored in the reference image database, a target image age, which is an age of the registered person at the time of capturing the target face image;

(c) determining, by multiplying (i) a difference between the target face image capturing time obtained in the step (a) and the reference face image capturing time stored in the reference image database by (ii) a value of the coefficient stored in the coefficient storage section which value corresponds to the target image age determined in the step (b), an applicability indicative of how suitably said each of the plurality of reference face images is applicable in the matching with the target face image included in the captured image; and (d) selecting the reference face image for use in the matching on a basis of (i) the target face image capturing time obtained in the step (a) and (ii) the reference face image capturing time stored in the reference image database, the reference face image selected having an applicability, determined in the step (c), which exceeds a predetermined threshold.

9. A method for controlling a face matching device for matching (i) a target face image, included in a captured image and serving as a matching target, with (ii) a reference face image, registered in a reference image database and serving as a face image for reference, the reference image database being capable of (i) storing a plurality of reference face images for each registered person and further (ii) storing (a) for each of the plurality of reference face images, a reference face image capturing time, which is a time of capturing said each of the plurality of reference face images, and (b) a time of birth of the registered person, the face matching device including a coefficient storage section which stores a coefficient corresponding to a general age of the registered person, the coefficient (i) being at a maximum in a case where the general age is 0, (ii) decreasing as the general age increases, and (iii) changing at a rate which is higher as the general age is earlier, the method comprising the steps of:

(a) obtaining a target face image capturing time, which is a time of capturing the target face image;

(b) determining, on a basis of (i) the target face image capturing time obtained in the step (a) and (ii) the time of birth stored in the reference image database, a target image age, which is an age of the registered person at the time of capturing the target face image;

(c) determining, by multiplying (i) a difference between the target face image capturing time obtained in the step (a) and the reference face image capturing time stored in the reference image database by (ii) a value of the coefficient stored in the coefficient storage section which value corresponds to the target image age determined in the step (b), an applicability indicative of how suitably said each of the plurality of reference face images is applicable in the matching with the target face image included in the captured image; and (d) selecting the reference face image for use in the matching on a basis of (i) the target face image capturing time obtained in the step (a) and (ii) the reference face image capturing time stored in the reference image database, the reference face image selected having an applicability, determined in the step (c), which exceeds a predetermined threshold.

10. A method for controlling a face matching device for matching (i) a target face image, included in a captured image and serving as a matching target, with (ii) a reference face image, registered in a reference image database and serving as a face image for reference, the reference image database being capable of (i) storing a plurality of reference face images for each registered person and further (ii) storing (a) a time of birth of the registered person, and (b) a reference image age, which is an age of the registered person at the reference face image capturing time, the face matching device including a coefficient storage section which stores a coefficient corresponding to a general age of the registered person, the coefficient (i) being at a maximum in a case where the general age is 0, (ii) decreasing as the general age increases, and (iii) changing at a rate which is higher as the general age is earlier, the method comprising the steps of (a) obtaining a target face image capturing time, which is a time of capturing the target face image;

(b) determining, on a basis of (i) the target face image capturing time obtained in the step (a) and (ii) the time of birth stored in the reference image database, a target image age, which is an age of the registered person at the time of capturing the target face image;

(c) determining, by multiplying (i) a difference between the target image age determined in the step (b) and the reference image age stored in the reference image database by (ii) a value of the coefficient stored in the coefficient storage section which value corresponds to the target image age determined in the step (b), an applicability indicative of how suitably said each of the plurality of reference face images is applicable in the matching with the target face image included in the captured image; and (d) selecting the reference face image for use in the matching on a basis of (i) the target face image capturing time obtained in the step (a) and (ii) the time of birth and the reference image age both stored in the reference image database, the reference face image selected having an applicability, determined in the step (c), which exceeds a predetermined threshold.

* * * * *